US012158710B2

(12) United States Patent
Tetsuno

(10) Patent No.: US 12,158,710 B2
(45) Date of Patent: Dec. 3, 2024

(54) IMAGE FORMING APPARATUS THAT REMOVES RESIDUAL TONER WITH DEVELOPER CARRYING MEMBER

(71) Applicant: CANON KABUSHIKI KAISHA, Tokyo (JP)

(72) Inventor: Shuichi Tetsuno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/335,846

(22) Filed: Jun. 1, 2021

(65) Prior Publication Data

US 2021/0373454 A1 Dec. 2, 2021

(30) Foreign Application Priority Data

Jun. 2, 2020 (JP) ................................. 2020-096238

(51) Int. Cl.
*G03G 15/06* (2006.01)
*G03G 15/08* (2006.01)

(52) U.S. Cl.
CPC ....... *G03G 15/065* (2013.01); *G03G 15/0812* (2013.01)

(58) Field of Classification Search
CPC ......................... G03G 15/065; G03G 15/0812
See application file for complete search history.

(56) References Cited

U.S. PATENT DOCUMENTS 6,785,485 B2 8/2004 Kamimura
7,447,454 B2 * 11/2008 Nishimura ......... G03G 15/1675 399/314
7,593,669 B2 * 9/2009 Shigehiro .......... G03G 21/0064 399/53
7,672,626 B2 * 3/2010 Uchino .............. G03G 15/0233 399/286
8,346,130 B2 * 1/2013 Handa ................ G03G 15/0813 399/167
9,086,670 B2 * 7/2015 Matsuda ................ G03G 15/75
(Continued)

FOREIGN PATENT DOCUMENTS

JP 2002-215002 A 7/2002
JP 2007-133024 A 5/2007
(Continued)

*Primary Examiner* — Walter L Lindsay, Jr.
*Assistant Examiner* — Milton Gonzalez
(74) *Attorney, Agent, or Firm* — Venable LLP

(57) ABSTRACT

An image forming apparatus forms an image on a recording medium and includes a rotatable image bearing member, and a rotatable developer carrying member that carries a developer, forms a developing portion by contacting the image bearing member, and forms a developer image on a surface of the image bearing member by supplying the developer to an electrostatic latent image formed on the surface of the image bearing member in the developing portion. After performing an image forming operation, a controller controls driving of the image bearing member and the developer carrying member to perform a rotation operation for rotating the image bearing member with rotation of the developer carrying member stopped in a state where an amount of carried developer in the developing portion during the rotation operation is smaller than the amount of carried developer in the developing portion during the image forming operation.

21 Claims, 9 Drawing Sheets

(56) References Cited

U.S. PATENT DOCUMENTS

| | | | | |
|---|---|---|---|---|
| 2016/0320747 | A1* | 11/2016 | Mochizuki | G03G 15/50 |
| 2017/0308030 | A1* | 10/2017 | Tagami | G03G 21/1676 |
| 2020/0333726 | A1* | 10/2020 | Mukai | G03G 15/0818 |

FOREIGN PATENT DOCUMENTS

| | | | |
|---|---|---|---|
| JP | 2007-333852 | A | 12/2007 |
| JP | 2008-076689 | A | 4/2008 |

* cited by examiner

FIG.3

| CONFIGURATION | AFTER 4000 SHEETS ARE PRINTED | |
|---|---|---|
| | RESIDUAL TRANSFER GHOSTING | SUBSTANCES ADHERED TO PHOTOSENSITIVE DRUM |
| FIRST EMBODIMENT | ACCEPTABLE | NO |
| COMPARATIVE EXAMPLE 1 | UNACCEPTABLE | YES |

FIG.5

| CONFIGURATION | PRINT CONDITION | AFTER 4000 SHEETS ARE PRINTED | |
|---|---|---|---|
| | | RESIDUAL TRANSFER GHOSTING | SUBSTANCES ADHERED TO PHOTOSENSITIVE DRUM |
| SECOND EMBODIMENT | CONDITION 1 | ACCEPTABLE | NO |
| | CONDITION 2 | ACCEPTABLE | NO |
| | CONDITION 3 | ACCEPTABLE | NO |
| | CONDITION 4 | ACCEPTABLE | NO |

FIG.7

| IMPLEMENTATION TIME OF OPERATION 2 (msec) | | DETECTED HUMIDITY (%) | | | | |
|---|---|---|---|---|---|---|
| | | NOT LESS THAN 0, LESS THAN 20 | NOT LESS THAN 20, LESS THAN 40 | NOT LESS THAN 40, LESS THAN 60 | NOT LESS THAN 60, LESS THAN 80 | NOT LESS THAN 80, NOT MORE THAN 100 |
| DETECTED TEMPERATURE (°C) | LESS THAN 0 | 5600 | 5600 | 4200 | 4200 | 3500 |
| | NOT LESS THAN 0, LESS THAN 5 | 4900 | 4200 | 3500 | 3500 | 2800 |
| | NOT LESS THAN 10, LESS THAN 20 | 4200 | 3500 | 2800 | 2800 | 2100 |
| | NOT LESS THAN 20, LESS THAN 25 | 3500 | 2800 | 2100 | 2100 | 1400 |
| | NOT LESS THAN 25, LESS THAN 30 | 2800 | 2100 | 2100 | 1400 | 1400 |
| | NOT LESS THAN 30, LESS THAN 35 | 2100 | 2100 | 1400 | 1400 | 1400 |
| | NOT LESS THAN 35, LESS THAN 40 | 2100 | 1400 | 1400 | 1400 | 1400 |
| | NOT LESS THAN 40 | 1400 | 1400 | 1400 | 1400 | 1400 |

FIG.8

| CONFIGURATION | ENVIRONMENT | | | AFTER 4000 SHEETS ARE PRINTED | |
|---|---|---|---|---|---|
| | CONDITION | TEMPERATURE (°C) | HUMIDITY (%) | RESIDUAL TRANSFER GHOSTING | SUBSTANCES ADHERED TO PHOTOSENSITIVE DRUM |
| THIRD EMBODIMENT | 1 | 10 | 15 | ACCEPTABLE | NO |
| | 2 | 15 | 10 | ACCEPTABLE | NO |
| | 3 | 20 | 40 | ACCEPTABLE | NO |
| | 4 | 30 | 90 | ACCEPTABLE | NO |

IMAGE FORMING APPARATUS THAT REMOVES RESIDUAL TONER WITH DEVELOPER CARRYING MEMBER

BACKGROUND OF THE INVENTION

Field of the Invention

The present invention relates to an image forming apparatus that uses an electrophotographic process or the like.

Description of the Related Art

An image forming apparatus that forms images using an electrophotographic process, such as a copier or a laser printer, is available in the prior art. As a transfer process, the image forming apparatus transfers a toner image formed on a surface of a photosensitive drum serving as an image bearing member onto an intermediate transfer member or a recording material through electrostatic transfer by applying a voltage from a voltage supply to a transfer member disposed in a part opposing the photosensitive drum. When toner images are formed in a plurality of colors, the toner images in the plurality of colors are formed on the surface of the intermediate transfer member or the recording material by repeatedly executing this transfer process with respect to the toner images of the plurality of colors.

In recent years, a cleanerless system omitting a cleaning system for cleaning a surface of the photosensitive drum has been proposed with the aim of reducing the size of the image forming apparatus. The cleanerless system is a system that enables reuse of a toner by collecting the toner remaining on a photosensitive drum back in a developing apparatus. When the cleaning system for cleaning the surface of the photosensitive drum is omitted, toner, external additives, and so on are more likely to be adhered to the surface of the photosensitive drum, and it is therefore necessary to provide a technique for preventing this.

Japanese Patent Application Publication No. 2002-215002 discloses a configuration in which, by stopping a developing roller and driving only the photosensitive drum to rotate in a state where the developing roller and the photosensitive drum are in contact with each other, the developing roller and the photosensitive drum are caused to rub against each other, thereby removing an adhered substance such as toner or an external additive adhered to the surface of the photosensitive drum.

With the configuration of Japanese Patent Application Publication No. 2002-215002, however, the developing roller and the photosensitive drum are rubbed against each other in a state where toner is interposed between the developing roller and the photosensitive drum. Therefore, the toner acts as a lubricant such that rubbing between the developing roller and the photosensitive drum is reduced, and as a result, depending on the amount or strength of the adhered substance, such as toner or an external additive, adhered to the surface of the photosensitive drum, it may be impossible to sufficiently remove the substance adhered to the surface of the photosensitive drum.

Hence, an object of the present invention is to provide an image forming apparatus with which a substance adhered to the surface of an image bearing member can be sufficiently removed.

SUMMARY OF THE INVENTION

In order to achieve the object described above, an image forming apparatus for forming an image on a recording medium includes a rotatable image bearing member; an exposure portion that forms an electrostatic latent image on a surface of the image bearing member by exposing the image bearing member; a rotatable developer carrying member that carries a developer, forms a developing portion in contact with the image bearing member, and forms a developer image on the surface of the image bearing member by supplying the developer to the electrostatic latent image formed on the surface of the image bearing member in the developing portion; and a controller that controls driving of the image bearing member and the developer carrying member, wherein, after performing an image forming operation, the controller controls to perform a rotation operation for rotating the image bearing member with rotation of the developer carrying member stopped in a state where an amount of carried developer in the developing portion during the rotation operation is smaller than the amount of carried developer in the developing portion during the image forming operation.

Further features of the present invention will become apparent from the following description of exemplary embodiments (with reference to the attached drawings).

BRIEF DESCRIPTION OF THE DRAWINGS

FIG. 3 is a table showing results of effect confirmation tests applied to the cleaning operation according to the first embodiment;

FIG. 5 is a table showing results of effect confirmation tests applied to the cleaning operation according to the second embodiment;

FIG. 7 is a table showing an implementation time of the cleaning operation according to the third embodiment; and FIG. 8 is a table showing results of effect confirmation tests applied to the cleaning operation according to the third embodiment.

DESCRIPTION OF THE EMBODIMENTS

Preferred exemplary embodiments of the present invention will be described in detail below with reference to the figures. Note, however, that dimensions, materials, shapes, relative arrangements, and so on of constituent components described in the following embodiments are to be modified as appropriate in accordance with the configuration of the apparatus to which the present invention is applied and various conditions. Hence, unless specified otherwise, the scope of the present invention is not limited solely thereto.

First Embodiment

Figure 1A:
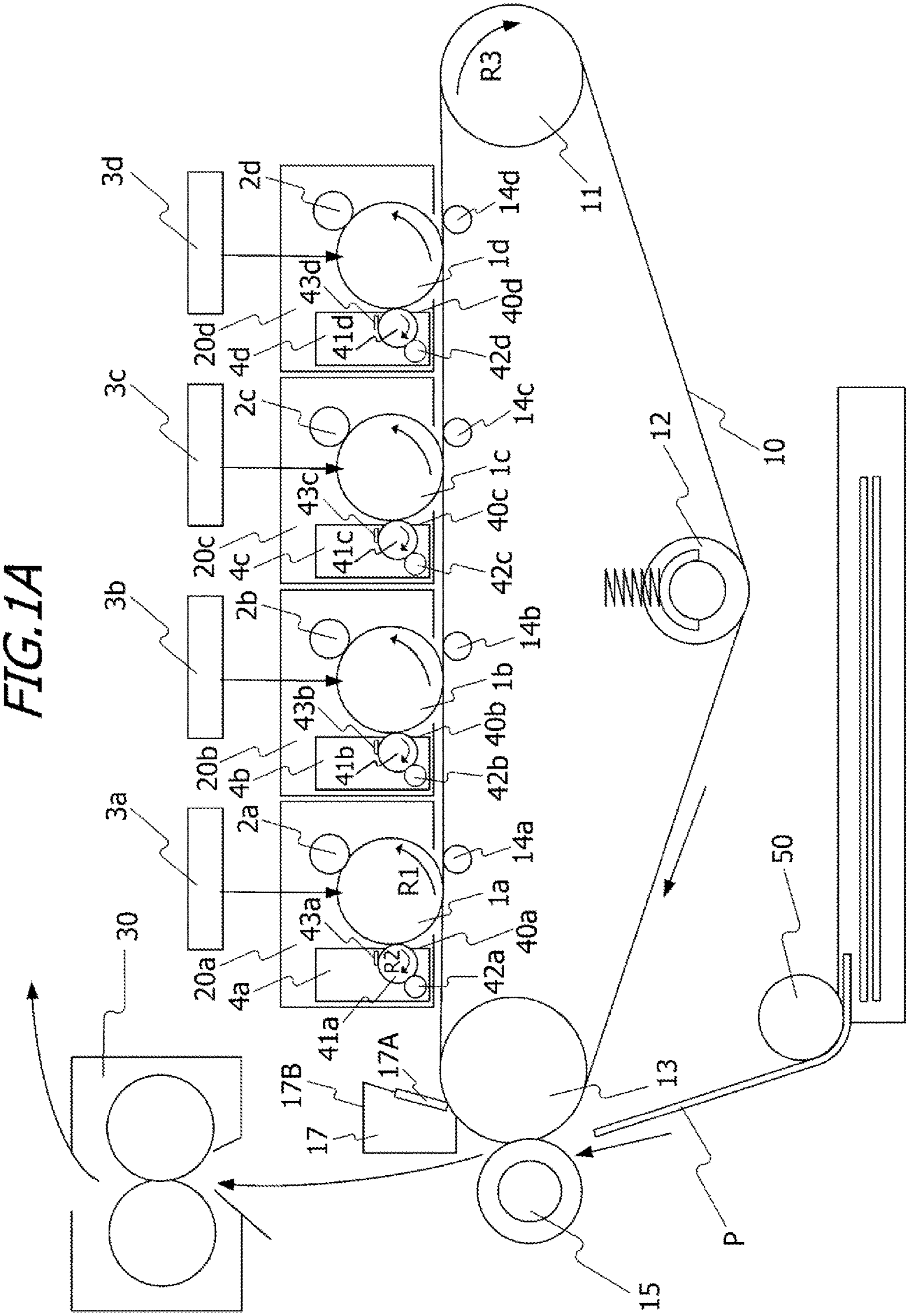
FIG. 1A is a schematic view of an image forming apparatus according to a first embodiment.

The present invention relates specifically to an image forming apparatus that uses a so-called drum cleanerless system not having means for cleaning the image bearing member. FIG. 1A is a schematic view showing an example of a color image forming apparatus. The configuration and operation of the image forming apparatus according to this embodiment will be described using FIG. 1A. Note that the image forming apparatus of this embodiment is a so-called tandem-type printer provided with image forming stations 20*a* to 20*d* serving as image forming portions. A first image forming station 20*a* forms a yellow (Y) image, while a second image forming station 20*b* forms a magenta (M) image. A third image forming station 20*c* forms a cyan (C) image, while a fourth image forming station 20*d* forms a black (Bk) image. Apart from the color of the toner housed therein, the image forming stations 20*a* to 20*d* are configured identically, and the first image forming station 20*a* will be used in the following description.

The first image forming station 20*a* includes a rotatable, drum-shaped electrophotographic photosensitive member (referred to hereafter as a photosensitive drum) 1*a*, a charging roller 2*a* serving as a charging member, an exposure device 3*a* serving as an exposure portion, and a developing device (developing unit) 4*a*. The photosensitive drum 1*a* is an image bearing member that is driven to rotate in a direction indicated by an arrow at a circumferential speed (a process speed) of 150 mm/sec, and that carries a toner image (a developer image). The photosensitive drum 1*a* is formed by providing a photosensitive layer and a surface layer on an aluminum element tube having a diameter of 20 mm. A thin film layer formed from polyarylate at a film thickness of 20 μm is used as the surface layer of the photosensitive drum 1*a*. A resin such as polyester, polycarbonate, polymethacrylic acid ester, polyarylate, polysulfone, or polystyrene, for example, is preferably used as the surface layer of the photosensitive drum 1*a*. From the viewpoint of wear resistance, polycarbonate or polyarylate is more preferably used as the surface layer of the photosensitive drum 1*a*. Also from the viewpoint of wear resistance, the weight-average molecular weight (Mw) of the polycarbonate or polyarylate is preferably within a range of 10000 to 300000.

Figure 1B:
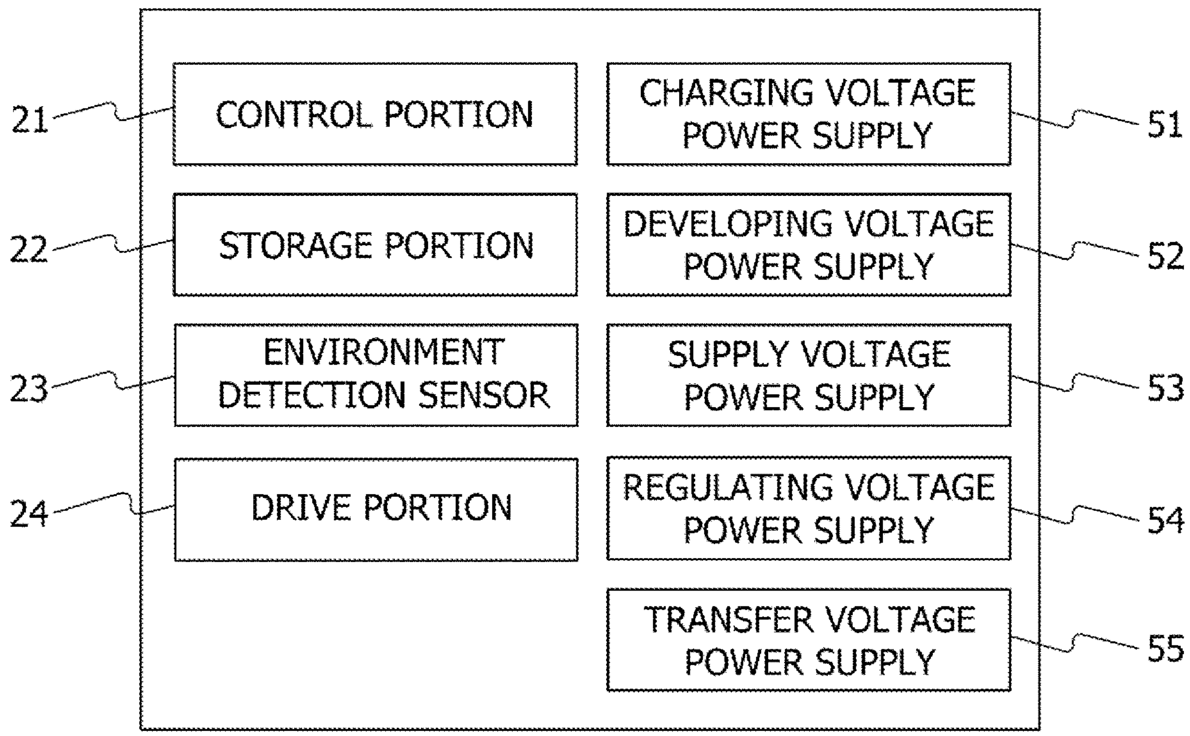
FIG. 1B is a functional block diagram of the image forming apparatus according to the first embodiment.

FIG. 1B is a block diagram of the image forming apparatus. The image forming apparatus includes a control portion 21 such as a controller or a CPU, a storage portion 22 such as a RAM or a ROM, an environment detection sensor 23 such as a temperature detection sensor or a humidity detection sensor, and a drive portion 24. An image forming operation is started when the control portion 21 receives an image signal from a host computer (not shown), whereupon the photosensitive drum 1*a* is driven to rotate. The storage portion 22 stores the image signal, various data, and so on. The environment detection sensor 23 detects the temperature and humidity on the periphery of the image forming apparatus. The drive portion 24 drives the photosensitive drum 1*a* and a developing roller 41*a* to rotate. The image forming apparatus also includes a charging voltage power supply 51, a developing voltage power supply 52, a supply voltage power supply 53, a regulating voltage power supply 54, and a transfer voltage power supply 55. The control portion 21 controls respective voltages of the charging voltage power supply 51, the developing voltage power supply 52, the supply voltage power supply 53, the regulating voltage power supply 54, and the transfer voltage power supply 55.

As the photosensitive drum 1*a* rotates, the surface of the photosensitive drum 1*a* is uniformly charged to a predetermined potential at a predetermined polarity (in this embodiment, negative polarity) by the charging roller 2*a*, and receives exposure corresponding to the image signal from the exposure device 3*a*. As a result, an electrostatic latent image corresponding to a yellow component image of a target color image is formed on the surface of the photosensitive drum 1*a*. Next, the electrostatic latent image formed on the surface of the photosensitive drum 1*a* is developed by the developing device (a yellow developing device) 4*a* in a developing position so as to be visualized as a yellow toner image.

The charging roller 2*a* comes into contact with the surface of the photosensitive drum 1*a* by a predetermined pressing force, with the result that the charging roller 2*a* is driven to rotate in conjunction with the photosensitive drum 1*a* by friction between the charging roller 2*a* and the surface of the photosensitive drum 1*a*. Further, a predetermined DC voltage (a charging voltage) is applied to a rotary shaft of the charging roller 2*a* from the charging voltage power supply 51, which serves as a charging voltage application portion, in accordance with the image forming operation. The charging roller 2*a* used in this embodiment is formed by providing an elastic layer constituted by a conductive elastic member with a thickness of 1.5 mm and a volume resistivity of approximately $1\times10^6$ 11 cm on a metal shaft with a diameter of 5.5 mm. In accordance with the image forming operation, a DC voltage of −1000 V is applied to the rotary shaft of the charging roller 2*a* as the charging voltage, whereby the surface of the photosensitive drum 1*a* is charged to a predetermined potential (−500 V) by the charging roller 2*a* to which the charging voltage is applied. The surface potential of the photosensitive drum 1*a* is measured using a surface potentiometer Model 344, manufactured by Trek. The surface potential (−500 V) of the photosensitive drum 1*a* at this time is a non-image forming potential (a dark portion potential) of the photosensitive drum 1*a*, and therefore the toner image is not developed on the surface of the photosensitive drum 1*a* when the non-image forming potential is formed thereon.

Further, a large number of protruded portions are provided on the surface layer of the charging roller 2*a*, and the average height of the protruded portions is approximately 10 μm. The protruded portions provided on the surface layer of the charging roller 2*a* act as spacers between the charging roller 2*a* and the photosensitive drum 1*a* in a charging portion where the charging roller 2*a* and the photosensitive drum 1*a* come into contact with each other. When untransferred toner on the photosensitive drum 1*a* (toner that is not subjected to primary transfer and remains on the photosensitive drum 1*a*) enters the charging portion, the protruded portions prevent locations other than the protruded portions from touching the untransferred toner, thereby preventing the charging roller 2*a* from being contaminated by the untransferred toner.

The exposure device 3*a* includes a laser driver, a laser diode, a polygon mirror, an optical lens system, and so on. The exposure device 3*a* forms an electrostatic latent image on the surface of the uniformly charged photosensitive drum 1*a* by irradiating the surface of the photosensitive drum 1*a* with laser light on the basis of image information input from the host computer (not shown). In this embodiment, the amount of exposure applied by the exposure device 3*a* is regulated so that the surface potential of the photosensitive drum 1*a* following exposure by the exposure device 3*a* reaches an image forming potential VL (−100 V). The image forming potential VL is also known as a light portion potential.

The developing device 4*a* includes the developing roller 41*a*, which serves as a developing member (a developer carrying member), and a developer container 40*a* housing nonmagnetic mono-component toner (referred to as toner hereafter) serving as a developer, and develops the electrostatic latent image as a toner image. The developing device 4*a* is rotatable developing means that carries toner and forms a developer image on the surface of the photosensitive drum 1*a* by supplying the toner to the electrostatic latent image formed on the surface of the photosensitive drum 1*a*. The developing device 4*a* and the image forming apparatus body include a control mechanism (not shown) for controlling a contact/separation (development/separation) state between the developing roller 41*a* and the photosensitive drum 1*a*. The control mechanism causes the developing roller 41*a* and the photosensitive drum 1*a* to come into contact with each other and separate from each other in accordance with the image forming operation and so on.

When the developing roller 41*a* and the photosensitive drum 1*a* come into contact with each other, the developing roller 41*a* is in contact with the photosensitive drum 1*a* by a pressing force of 200 gf. When the developing roller 41*a* and the photosensitive drum 1*a* are in contact with each other, a contact portion is formed. The width of the contact portion (referred to hereafter as a development nip portion) between the developing roller 41*a* and the photosensitive drum 1*a* is 2 mm in the rotation direction of the photosensitive drum 1 and 220 mm in the longitudinal direction (the rotary axis direction) of the photosensitive drum 1. The developing roller 41*a* rotates in the opposite direction (the direction of an arrow R2 in FIG. 1A) to the rotation direction of the photosensitive drum 1*a* (the direction of an arrow R1 in FIG. 1A) at a higher surface movement speed (circumferential speed hereafter) than the circumferential speed of the photosensitive drum 1*a*. In the development nip portion serving as the developing portion, the circumferential speed of the developing roller 41*a* is 140% of the circumferential speed of the photosensitive drum 1*a*, and the developing roller 41*a* is driven to rotate so that the surface movement direction of the developing roller 41*a* is a forward direction corresponding to the surface movement direction of the photosensitive drum 1*a*. By controlling the drive portion 24, the control portion 21 controls starting and stopping of rotational driving of the photosensitive drum 1*a* and the developing roller 41*a* by the drive portion 24, as well as the respective circumferential speeds thereof. In this embodiment, the photosensitive drum 1*a* and the developing roller 41*a* may be driven to rotate either in a form whereby drive is transmitted thereto independently using a gear and a clutch, or by providing independent drive portions therefor.

The developing roller 41*a* is an elastic roller formed by successively laminating an elastic layer and a surface layer on a core metal having a diameter of 6 mm. The surface layer of the developing roller 41*a* is formed from polyurethane resin. Polyurethane resin exhibits superior electrical insulation and flexibility and has the high wear resistance required of the developing roller 41*a*, and therefore polyurethane resin is preferably used as the surface layer of the developing roller 41*a*. Ether-based polyurethane resin, ester-based polyurethane resin, acryl-based polyurethane resin, polycarbonate-based polyurethane resin, polyolefin-based polyurethane resin, and so on may be cited as examples of polyurethane resin. Polycarbonate-based polyurethane resin and polyolefin-based polyurethane resin, with which electrical insulation and flexibility can easily be acquired, are preferably used as the surface layer of the developing roller 41*a*. The thickness of the surface layer of the developing roller 41*a* according to the first embodiment is approximately 10 μm. From the viewpoints of toner transportability and durability, the thickness of the surface layer of the developing roller 41*a* is preferably at least 5 μm and not more than 15 μm.

To improve the toner transportability, particles formed from urethane resin are added to the surface layer of the developing roller 41*a*. Particles formed from another resin such as acrylic resin, fluorine resin, polyester resin, polyether resin, or polycarbonate resin, or particles formed from an inorganic compound such as silica, alumina, or silicon carbide may be cited as the particles added to the surface layer of the developing roller 41*a*. In view of the ease of simultaneously acquiring toner transportability and flexibility, which is a general mechanical characteristic required of the developing roller 41*a*, resin particles, and more specifically urethane resin particles, are preferably added to the surface layer of the developing roller 41*a*. The average particle diameter of the urethane resin particles added to the surface layer of the developing roller 41*a* according to the first embodiment is approximately 10 μm. From the viewpoints of toner transportability and durability, the average particle diameter of the particles (urethane resin particles, for example) added to the surface layer of the developing roller 41*a* is preferably at least 5 μm and not more than 15 μm.

An elastic layer formed from silicone rubber is provided on the developing roller 41*a*. The developing roller 41*a* is constantly pressed against the photosensitive drum 1*a* and the toner, and in order to reduce mutually inflicted damage between these members, an elastic layer having properties of low hardness and low compression set is preferably provided on the developing roller 41*a*. Natural rubber, isoprene rubber, styrene rubber, butyl rubber, butadiene rubber, fluorine rubber, urethane rubber, silicone rubber, and so on can be cited as examples of the material of the elastic layer of the developing roller 41*a*. These materials may be used singly or in combinations of two or more. Hence, the elastic layer of the developing roller 41*a* may be formed from at least one type of rubber selected from a group including natural rubber, isoprene rubber, styrene rubber, butyl rubber, butadiene rubber, fluorine rubber, urethane rubber, and silicone rubber. The thickness of the elastic layer of the developing roller 41*a* according to the first embodiment is approximately 2 mm. The thickness of the elastic layer of the developing roller 41*a* is preferably at least 0.5 mm and not more than 10.0 mm.

The Asker C hardness of the developing roller 41*a* according to the first embodiment is 65. The Asker C hardness of the developing roller 41*a* is preferably at least 10 and not more than 80. By setting the Asker C hardness of the developing roller 41*a* at no less than 10, compression set generated by members disposed opposite the developing roller 41*a* can be suppressed. Further, by setting the Asker C hardness of the developing roller 41*a* at no more than 80, stress on the toner can be suppressed, with the result that a reduction in image quality resulting from a repeated image forming operation can be suppressed. The Asker C hardness of the developing roller 41*a* is measured using an Asker rubber hardness meter (manufactured by Kobunshi Keiki Co., Ltd.).

A toner supply roller 42*a* serving as a supply member is a sponge roller acquired by forming an elastic layer with a foam skeleton-shaped sponge structure on a metallic core metal. During the image forming operation, a voltage of −500 V is applied to the core metal of the toner supply roller 42*a* as a supply voltage from the supply voltage power supply 53 serving as a supply voltage application portion. The toner supply roller 42*a* is driven to rotate in contact with the developing roller 41*a* within the developer container 40*a*, thereby supplying the toner to the surface of the developing roller 41*a*. A developing blade 43*a* serving as a regulating member is a metal plate formed from SUS, which regulates the thickness of the toner carried on the surface of the developing roller 41*a*. During the image forming operation, a voltage of −500 V is applied to the developing blade 43*a* as a regulating voltage from the regulating voltage power supply 54 serving as a regulating voltage application portion. As the developing roller 41*a* rotates, the developing blade 43*a* rubs against the toner supplied onto the developing roller 41*a* so that the developing roller 41*a* is uniformly coated with the toner.

While the developing roller 41*a* and the photosensitive drum 1*a* are in contact with each other during the image forming operation, a DC voltage of −300 V is applied to the core metal of the developing roller 41*a* as a developing voltage from the developing voltage power supply 52 serving as a developing voltage application portion. During the image forming operation, electrostatic force is generated by a potential difference between a developing potential formed on the developing roller 41*a* by the developing voltage (−300 V) and the image forming potential VL (−100 V) of the photosensitive drum 1*a*. In response to this electrostatic force, the toner carried on the developing roller 41*a* moves to a position (an exposed part) of the photosensitive drum 1*a* in which the image forming potential VL is formed, with the result that a toner image corresponding to the electrostatic latent image is developed on the photosensitive drum 1*a*. Photosensitive drums 1*b* to 1*d*, charging rollers 2*b* to 2*d*, exposure devices 3*b* to 3*d*, and developing devices 4*b* to 4*d* are respectively configured similarly to the photosensitive drum 1*a*, the charging roller 2*a*, the exposure device 3*a*, and the developing device 4*a*. Further, developer containers 40*b* to 40*d*, developing rollers 41*b* to 41*d*, toner supply rollers 42*b* to 42*d*, and developing blades 43*b* to 43*d* are respectively configured similarly to the developer container 40*a*, the developing roller 41*a*, the toner supply roller 42*a*, and the developing blade 43*a*.

The toner according to this embodiment is negatively charged, nonmagnetic toner manufactured using a suspension polymerization method, and the volume average particle diameter of the toner is 7.0 The toner is charged to negative polarity when carried on the developing roller 41*a*. The normal charging polarity (normal polarity) of the toner according to this embodiment is set as negative polarity. A charging voltage, a developing voltage, a supply voltage, and a regulating voltage of the same polarity (in this embodiment, negative polarity) as the normal polarity of the toner are applied respectively to the charging roller 2*a*, the developing roller 41*a*, the toner supply roller 42*a*, and the developing blade 43*a*. Note that the normal polarity of the toner may be positive polarity. In this case, the polarity of the voltages applied to the respective members may be set at the opposite polarity to this embodiment. The volume average particle diameter of the toner can be measured using a laser diffraction particle size distribution meter LS-230, manufactured by Beckman Coulter Inc.

An intermediate transfer belt (an intermediate transfer member) 10 is stretched by an opposing roller 13 serving as an opposing member, and a drive roller 11 and a tension roller 12 serving as tension members. When the drive roller 11 rotates in the direction of an arrow R3, the intermediate transfer belt 10 is driven to rotate at substantially the same circumferential speed as the photosensitive drum 1*a*. At the time of primary transfer during the image forming operation, a DC voltage of +300 V is applied to a primary transfer member (a primary transfer roller) 14*a* as a primary transfer voltage from the transfer voltage power supply 55 serving as a transfer voltage application portion. The control portion 21 controls the transfer voltage power supply 55 so that a primary transfer voltage of the opposite polarity (in this embodiment, positive polarity) to the normal polarity of the toner is applied to the primary transfer member 14*a* from the transfer voltage power supply 55. The yellow toner image formed on the photosensitive drum 1*a* is electrostatically transferred onto the intermediate transfer belt 10 in the process of passing through a contact portion (referred to hereafter as a primary transfer portion) in which the primary transfer member 14*a* is in contact with the photosensitive drum 1*a* via the intermediate transfer belt 10 (primary transfer).

The primary transfer member 14*a* is a cylindrical metal roller having a diameter of 6 mm, and nickel-plated SUS is used as the raw material of the primary transfer member 14*a*. The primary transfer member 14*a* is disposed in a position offset 8 mm from a central position of the photosensitive drum 1*a* toward the downstream side in the movement direction of the intermediate transfer belt 10. Further, the primary transfer member 14*a* is disposed so that the intermediate transfer belt 10 is wound around the photosensitive drum 1*a*. To be able to secure the amount by which the intermediate transfer belt 10 is wound around the photosensitive drum 1*a*, the primary transfer member 14*a* is disposed in a position raised 1 mm relative to a horizontal plane formed by the photosensitive drum 1*a* and the intermediate transfer belt 10 so as to press the intermediate transfer belt 10 with a force of approximately 200 gf. The primary transfer member 14*a* rotates in conjunction with the rotation of the intermediate transfer belt 10. Further, primary transfer members 14*b*, 14*c*, 14*d* arranged respectively in the second image forming station 20*b*, the third image forming station 20*c*, and the fourth image forming station 20*d* are configured similarly to the primary transfer member 14*a*.

Thereafter, a second magenta toner image, a third cyan toner image, and a fourth black toner image are formed similarly by the second, third, and fourth image forming stations 20*b*, 20*c*, 20*d*. The toner images of the respective colors are successively transferred in laminated fashion onto the intermediate transfer belt 10, whereby a composite color image corresponding to the target color image is acquired. The four toner images on the intermediate transfer belt 10 are then transferred all at once onto the surface of a recording material (a recording medium) P fed by paper feeding means 50 in the process of passing through a secondary transfer nip portion formed by the intermediate transfer belt 10 and a secondary transfer roller 15 (secondary transfer). The secondary transfer roller 15 rotates in conjunction with the rotation of the intermediate transfer belt 10. Furthermore, during secondary transfer of the toner on the intermediate transfer belt 10 onto the recording material P, which is constituted by paper or the like, a DC voltage of +1500 V is applied to the secondary transfer roller 15 as a secondary transfer voltage from the transfer voltage power supply 55. Thus, a secondary transfer voltage of the opposite polarity (in this embodiment, positive polarity) to the normal polarity of the toner is applied to the secondary transfer roller 15 from the transfer voltage power supply 55.

Next, the recording material P carrying the four-color toner image is introduced into a fixing portion (a fixing device) 30 in which heat and pressure are applied to the toner of the four colors, with the result that the toner is melted and intermixed and thereby fixed onto the recording material P. The toner that remains on the intermediate transfer belt 10 following secondary transfer is cleaned away and removed by a cleaning device (an intermediate transfer belt cleaning device) 17 serving as a collecting member. The cleaning device 17 includes a cleaning blade 17A that comes into contact with the outer peripheral surface of the intermediate transfer belt 10 so as to scrape away the toner remaining on the intermediate transfer belt 10, a storage container 17B that collects and stores the toner scraped away by the cleaning blade, and so on. The cleaning device 17 is disposed so as to collect toner adhered to a part of the intermediate transfer belt 10 on the downstream side of the secondary transfer nip portion in the rotation direction of the intermediate transfer belt 10. By performing the operation described above, the image forming apparatus forms a full-color printed image on the recording material P.

A cleaning operation for removing an adhered substance such as toner or an external additive adhered to the surface of the photosensitive drum 1, which is a feature of this embodiment, will now be described. During the cleaning operation, in a state where no toner exists in the development nip portion serving as the contact portion (contact region) between the developing roller 41 and the photosensitive drum 1 or a state in which the amount of carried toner in the development nip portion is small, the photosensitive drum 1 is driven to rotate while keeping the developing roller 41 stopped. By rotating the photosensitive drum 1, the surface of the developing roller 41 rubs against the substance adhered to the photosensitive drum 1, and as a result, the substance adhered to the photosensitive drum 1 is scraped away.

Figure 2:
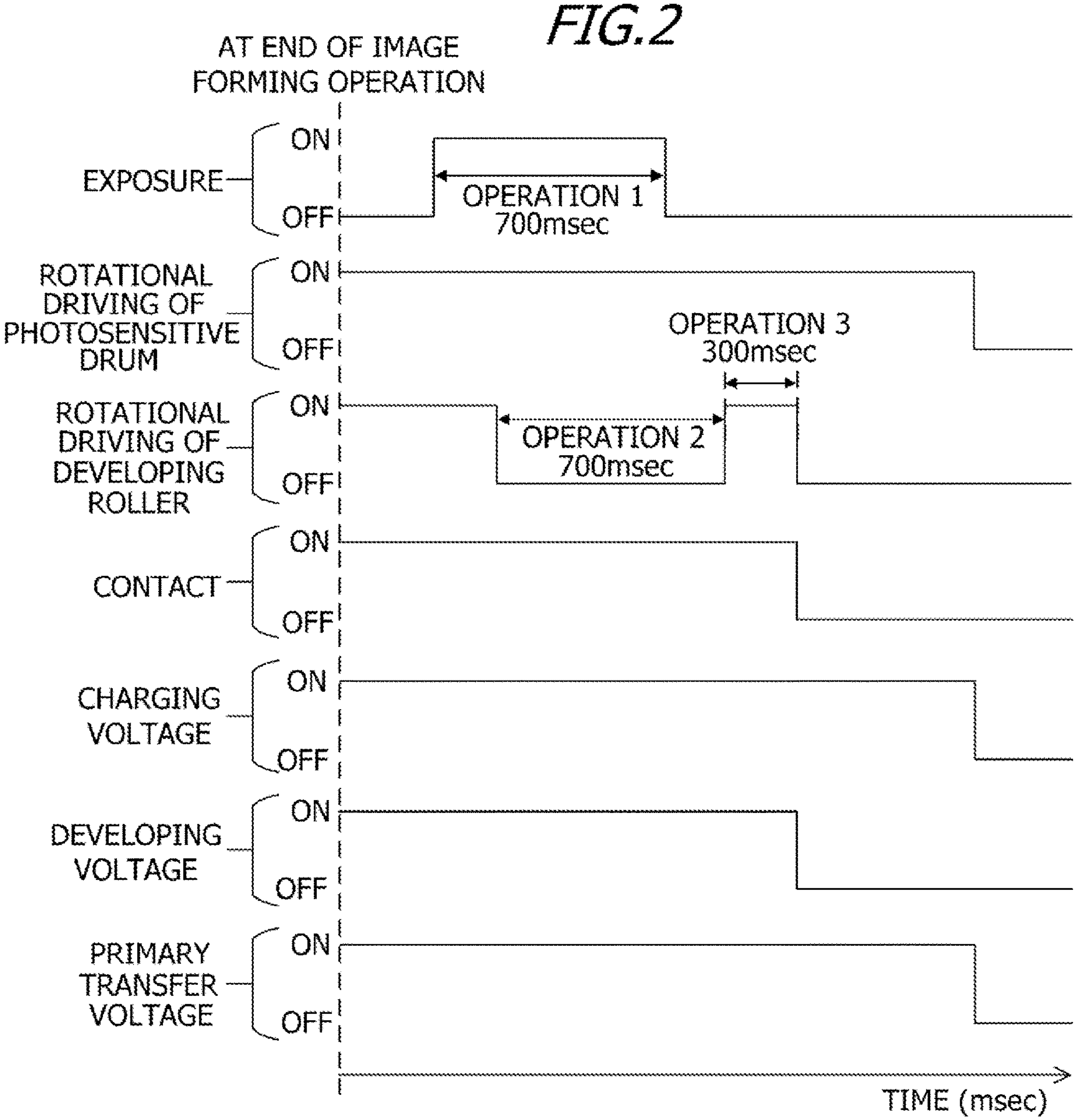
FIG. 2 is a timing chart of a cleaning operation according to the first embodiment.

FIG. 2 is a timing chart of the cleaning operation performed by the image forming apparatus of this embodiment. FIG. 2 shows an exposure timing, timings at which the photosensitive drum 1 and the developing roller 41 are driven to rotate during implementation of the cleaning operation, a timing at which the developing roller 41 and the photosensitive drum 1 come into contact with each other, and timings at which voltages are applied by the respective high-voltage power supplies. As shown in FIG. 2, the cleaning operation is implemented after the completion of image forming operations for a series of print jobs (i.e., following image formation). The cleaning operation (rotation operation) is performed by having the control portion 21 control the drive portion 24 so that driving of the photosensitive drum 1 and the developing roller 41 is controlled by the drive portion 24.

Before the start of the cleaning operation, the developing roller 41 and the photosensitive drum 1 are in contact with each other, and the developing roller 41 and photosensitive drum 1 are being driven to rotate. The charging voltage (−1000 V) applied to the charging roller 2 before the start of the cleaning operation and during the cleaning operation is the same as the charging voltage (−1000 V) applied to the charging roller 2 during the image forming operation. The developing voltage (−300 V) applied to the developing roller 41 before the start of the cleaning operation and during the cleaning operation is the same as the developing voltage (−300 V) applied to the developing roller 41 during the image forming operation. The primary transfer voltage (+300 V) applied to the primary transfer member 14 before the start of the cleaning operation and during the cleaning operation is the same as the primary transfer voltage (+300 V) applied to the primary transfer member 14 during the image forming operation.

First, as operation 1, the control portion 21 controls the exposure device 3 so that the surface of the photosensitive drum 1 is exposed for 700 msec, whereby the surface potential of the photosensitive drum 1 is set at the image forming potential VL.

Next, as operation 2, the photosensitive drum 1 is rotated, and at the timing when the exposed surface of the photosensitive drum 1, exposed by the exposure device 3, reaches the development nip portion, rotational driving of the developing roller 41 is stopped while continuing to drive the photosensitive drum 1 to rotate. In other words, the control portion 21 controls driving of the photosensitive drum 1 and the developing roller 41 so that after the image forming operation, the photosensitive drum 1 rotates in a state where rotation of the developing roller 41 is stopped. The stoppage time during which rotational driving of the developing roller 41 is stopped is 700 msec, for example. When the exposed surface of the photosensitive drum 1 reaches the development nip portion, the toner on the developing roller 41 in the development nip portion moves onto the exposed surface of the photosensitive drum 1 in accordance with the potential relationship between the developing roller 41 and the photosensitive drum 1. More specifically, a predetermined potential difference is formed between at least the part of the surface of the photosensitive drum 1 that passes through the development nip portion as the photosensitive drum 1 rotates and the developing roller 41, and as a result, the toner in the development nip portion moves onto the developing roller 41. Having moved onto the developing roller 41, the toner is transported to the outside of the development nip portion as the photosensitive drum 1 is driven to rotate.

Further, during operation 2, the developing roller 41 is in a stopped state, and therefore no new toner is supplied to the development nip portion in response to rotational driving of the developing roller 41. Hence, the amount of toner between the developing roller 41 and the photosensitive drum 1 in the development nip portion decreases. In other words, the amount of toner in the development nip portion after the image forming operation becomes smaller than the amount of toner in the development nip portion during the image forming operation. As a result, a state in which the surface of the developing roller 41 and the surface of the photosensitive drum 1 are in direct contact with each other is formed. In the state where the surface of the developing roller 41 and the surface of the photosensitive drum 1 are in direct contact with each other and the developing roller 41 is stopped, the photosensitive drum 1 continues to be driven to rotate. Accordingly, substances adhered to the surface of the photosensitive drum 1 rub against the developing roller 41, whereby the substances adhered to the surface of the photosensitive drum 1 are scraped onto the developing roller 41. The control portion 21 controls application of the primary transfer voltage to the primary transfer member 14 so that the toner that has moved onto the photosensitive drum 1 from the developing roller 41 is transferred onto the intermediate transfer belt 10. In other words, the toner that has moved onto the exposed surface of the photosensitive drum 1 and been transported to the outside of the development nip portion is transferred onto the intermediate transfer belt 10 in the primary transfer portion. The toner transferred onto the intermediate transfer belt 10 is then collected by the cleaning device 17 of the intermediate transfer belt 10. The toner that moves onto the photosensitive drum 1 from the developing roller 41 may be collected back on the developing roller 41 during operation 3, to be described below, instead of being transferred onto the intermediate transfer belt 10. The control portion 21 controls application of the primary transfer voltage to the primary transfer member 14 and application of the charging voltage to the charging roller 2 so that the toner that has moved onto the photosensitive drum 1 from the developing roller 41 passes through the primary transfer portion and then passes electrically through the charging portion serving as the contact portion between the charging roller 2 and the photosensitive drum 1. In this embodiment, the toner that moves onto the exposed surface of the photosensitive drum 1 from the developing roller 41 is toner charged to negative polarity, i.e., the normal polarity thereof. When the primary transfer voltage is set at a negative polarity with a larger absolute value than the surface potential formed on the exposed surface, the toner passes through the primary transfer portion. Further, due to the relationship between the charging voltage and the surface potential of the photosensitive drum 1, a potential difference remains on the surface of the photosensitive drum 1. By performing the control described above, control may be implemented so that the toner on the surface of the photosensitive drum 1 that has passed through the charging portion is collected back on the developing roller 41 in accordance with the potential difference between the surface potential of the photosensitive drum 1 and the developing voltage. Control may also be implemented so that the toner that has moved onto the photosensitive drum 1 from the developing roller 41 is moved onto the charging roller 2 in one go, without being transferred onto the intermediate transfer belt 10. By halting application of the charging voltage to the charging roller 2 or reducing the absolute value of the charging voltage below that used during the image forming operation after charging the surface of the photosensitive drum 1 to a predetermined potential using the charging roller 2 to which the charging voltage is applied, toner charged to the normal polarity thereof is caused to move onto the charging roller 2. The charging voltage applied at this time is preferably set at a charging voltage that forms a potential difference unaccompanied by discharge between the charging roller 2 and the photosensitive drum 1. By rotating the charging roller 2 while maintaining this potential difference for the duration of operation 2, the toner charged to the normal polarity is held on the charging roller 2. Once operation 2 is complete, the charging voltage is applied so as to move the toner back onto the photosensitive drum 1 from the charging roller 2. Control may then be implemented to collect the toner that has moved back onto the photosensitive drum 1 in the manner described above either during operation 3, to be described below, or using the developing roller 41 after the cleaning operation is complete.

Finally, as operation 3, which is performed after the substance adhered to the surface of the photosensitive drum 1 has been scraped onto the developing roller 41 in operation 2, the control portion 21 resumes rotational driving of the stopped developing roller 41 so as to drive the developing roller 41 to rotate for 300 msec. By driving the developing roller 41 to rotate, the adhered substance that was scraped onto the developing roller 41 in operation 2 is scraped away by the toner supply roller 42 such that the substance adhered to the developing roller 41 is collected in the developer container 40. During operation 3, the control mechanism preferably controls the contact/separation (development/separation) state between the developing roller 41 and the photosensitive drum 1 so that the developing roller 41 and the photosensitive drum 1 are separated from each other. However, even when the developing roller 41 and the photosensitive drum 1 are in contact with each other during operation 3, this does not pose a problem as long as the respective potentials of the developing roller 41 and the photosensitive drum 1 are adjusted, and therefore the developing roller 41 and the photosensitive drum 1 may contact each other.

The time during which the surface of the photosensitive drum 1 is exposed during operation 1 is preferably set at a time that allows the toner to be removed sufficiently from the development nip portion. The exposure time of operation 1 is preferably set so that the width of the exposed surface of the photosensitive drum 1 in the rotation direction (circumferential direction) of the photosensitive drum 1 is longer than the width of the development nip portion. In other words, the width (length) of the part of the photosensitive drum 1 on which the predetermined surface potential is formed in the rotation direction of the photosensitive drum 1 is preferably longer than the width of the development nip portion in the rotation direction of the photosensitive drum 1. Thus, in comparison with a case where the width of the exposed surface of the photosensitive drum 1 in the rotation direction of the photosensitive drum 1 is identical to or shorter than the width of the development nip portion, the amount of toner that moves from the surface of the developing roller 41 onto the exposed surface of the photosensitive drum 1 increases.

The time during which rotational driving of the developing roller 41 is stopped during operation 2 is preferably set at a time that allows the substance adhered to the photosensitive drum 1 to be sufficiently removed, and is preferably set at a longer time than the time required for the photosensitive drum 1 to rotate by at least one turn. Thus, the photosensitive drum 1 rotates by at least one turn within the time during which rotational driving of the developing roller 41 is stopped during operation 2 of the cleaning operation.

The time (referred to hereafter as a third operation time) during which the developing roller 41 is driven to rotate during operation 3 is preferably set at a time that allows the substance that was adhered to the photosensitive drum 1 and has been collected on the developing roller 41 to be collected in the developer container 40. The third operation time is preferably set at a time during which the surface of the developing roller 41, on which the substance that was adhered to the photosensitive drum 1 has been collected, passes over the surface of the toner supply roller 42 at least once. The third operation time may also be a time (a first time) extending from the timing at which the developing roller 41 starts to rotate to the point at which the part of the surface of the developing roller 41 that is in the position of the development nip portion when the developing roller 41 starts to rotate comes into contact with the toner supply roller 42. Thus, the part of the surface of the developing roller 41 that is in the position of the development nip portion when operation 2 is performed contacts the toner supply roller 42 when the developing roller 41 rotates during operation 3, whereby the adhered substance collected on the developing roller 41 is collected in the developer container 40. The third operation time may also be a time (a second time) extending from the timing at which the developing roller 41 starts to rotate to the point at which the part of the surface of the developing roller 41 that is in the position of the development nip portion when the developing roller 41 starts to rotate comes into contact with the developing blade 43. Thus, the part of the surface of the developing roller 41 that is in the position of the development nip portion when operation 2 is performed comes in to contact with the developing blade 43 when the developing roller 41 rotates during operation 3, whereby the adhered substance collected on the developing roller 41 is collected in the developer container 40. The second time is longer than the first time.

Effect Confirmation

To confirm the effects of the cleaning operation of this embodiment, the following effect confirmation tests were implemented. First, using the image forming apparatus of this embodiment in a new state, a print job in which the image forming operation was completed by consecutively printing two images with a print percentage of 5% is implemented 2000 times such that a total of 4000 sheets were printed. After printing the 4000 sheets, a test image was printed to confirm the presence or absence of residual transfer ghosting. Here, the print percentage is the area of the toner image per unit area. For example, a solid black image has a print percentage of 100%, and a solid white image has a print percentage of 0%.

During primary transfer, some of the toner may remain on the photosensitive drum 1 without being transferred onto the intermediate transfer belt 10, and the toner that remains on the photosensitive drum 1 during primary transfer is known as primary transfer residual toner. When the photosensitive drum 1 rotates by a single turn in a state where primary transfer residual toner remains on the photosensitive drum 1 and the primary transfer residual toner is transferred onto the intermediate transfer belt 10 during the next primary transfer, residual transfer ghosting occurs. When the surface of the photosensitive drum 1 is covered with an adhered substance, the adhesive force between the toner image and the photosensitive drum 1 increases, making residual transfer ghosting more likely to occur.

A test image was created by printing a solid black image in a region of the recording material P extending from 5 mm from the tip end thereof to a position 55 mm from the tip end thereof and over the entire width region of the recording material P. The occurrence, during formation of the solid black portion, of residual transfer ghosting as an image defect caused by primary transfer residual toner in the part of the recording material P where a solid white image is formed, this part being on the rear end side of the part (the solid black portion) of the recording material P where the solid black image is formed, was then determined. Finally, the surface of the photosensitive drum 1 after printing 4000 sheets was observed under an electron microscope to confirm the presence or absence of substances adhered to the surface of the photosensitive drum 1. The effect confirmation tests described above were all implemented in an environment with a temperature of 23° C. and a relative humidity of 50%. Similar effect confirmation tests to those of this embodiment were also implemented using an image forming apparatus according to comparative example 1, described below.

Comparative Example 1

The image forming apparatus of comparative example 1 is not provided with the cleaning device 17 of the first embodiment. All other configurations of the image forming apparatus of comparative example 1 are similar to the configurations of the first embodiment, and therefore description thereof has been omitted. FIG. 3 is a table showing results of the effect confirmation tests applied to the cleaning operation of the first embodiment. FIG. 3 also shows results of the effect confirmation tests applied to the cleaning operation of comparative example 1. As shown in FIG. 3, in the first embodiment, the cleaning operation is performed on the substance adhered to the photosensitive drum 1, and therefore, even after printing 4000 sheets, residual transfer ghosting did not occur, and the presence of substances adhered to the photosensitive drum 1 was not confirmed even under an electron microscope. In comparative example 1, on the other hand, the cleaning operation is not performed on the substance adhered to the photosensitive drum 1, and therefore, after printing 4000 sheets, residual transfer ghosting occurred, and the presence of an adhered substance covering the entire surface of the photosensitive drum 1 was confirmed under an electron microscope.

According to the first embodiment, as described above, the cleaning operation in which the photosensitive drum 1 rubs against the developing roller 41 is implemented in a state where no toner exists in the development nip portion or a state in which the amount of carried toner in the development nip portion is small. Thus, by means of a simple configuration, it is possible to provide an image forming apparatus with which an adhered substance such as toner or an external additive adhered to the surface of the photosensitive drum 1 can be sufficiently removed from the surface of the photosensitive drum 1 regardless of the amount or strength of the adhered substance.

In this embodiment, a potential relationship for moving the toner from the developing roller 41 to the photosensitive drum 1 is formed during operation 1 of the cleaning operation by exposing the photosensitive drum 1. The control portion 21 may perform processing to reduce the charging voltage applied to the charging roller 2 during operation 2 of the cleaning operation instead of processing for exposing the photosensitive drum 1. By reducing the charging voltage, the surface potential of the photosensitive drum 1, which is formed by electrical discharge, can be reduced, leading to an increase in the difference between the developing potential formed on the developing roller 41*a* and the surface potential of the photosensitive drum 1. As a result, the toner can be moved from the developing roller 41 onto the photosensitive drum 1 without exposing the photosensitive drum 1. For example, the processing for reducing the charging voltage applied to the charging roller 2 is processing for reducing the absolute value of the charging voltage applied to the charging roller 2 during operation 2 below the absolute value of the charging voltage applied to the charging roller 2 during the image forming operation. Alternatively, the control portion 21 may perform processing for increasing the developing voltage applied to the developing roller 41 during operation 2 of the cleaning operation instead of the processing for exposing the photosensitive drum 1. When the developing voltage is increased, the difference between the developing potential formed on the developing roller 41*a* and the surface potential of the photosensitive drum 1 increases. As a result, the toner can be moved from the developing roller 41 onto the photosensitive drum 1 without exposing the photosensitive drum 1. For example, the processing for increasing the developing voltage applied to the developing roller 41 is processing for increasing the absolute value of the developing voltage applied to the developing roller 41 during operation 2 above the absolute value of the developing voltage applied to the developing roller 41 during the image forming operation. Alternatively, the control portion 21 may perform both the processing for reducing the charging voltage applied to the charging roller 2 and the processing for increasing the developing voltage applied to the developing roller 41 during operation 2 of the cleaning operation instead of the processing for exposing the photosensitive drum 1. Moreover, during operation 2 of the cleaning operation, the control portion 21 may perform the processing for exposing the photosensitive drum 1 and at least one of the processing for reducing the charging voltage applied to the charging roller 2 and the processing for increasing the developing voltage applied to the developing roller 41. Needless to mention, likewise when a potential relationship for moving the toner from the developing roller 41 to the photosensitive drum 1 is formed by performing the types of processing described above, similar effects to those of the cleaning operation of this embodiment are acquired. Furthermore, the amount of exposure applied to the photosensitive drum 1 may be adjusted. For example, the amount of exposure applied to the photosensitive drum 1 may be reduced and the exposure time of operation 1 may be lengthened. By reducing the amount of exposure applied to the photosensitive drum 1, deterioration of the photosensitive drum 1 is suppressed.

Further, by reducing the amount of toner coverage on the developing roller 41 before implementing operation 2 of the cleaning operation according to this embodiment, the effect of the cleaning operation can be improved. The image forming apparatus includes a first control mode and a second control mode. The image forming apparatus may perform the image forming operation in the first control mode during image formation and execute the cleaning operation in the second control mode during post-rotation cleaning.

When the cleaning operation is executed in the second control mode, the control portion 21 may perform processing to increase the developing voltage applied to the developing roller 41 above the developing voltage applied during the image forming operation in the first control mode. When the cleaning operation is executed in the second control mode, the control portion 21 may perform processing to reduce the supply voltage applied to the toner supply roller 42 below the supply voltage applied during the image forming operation in the first control mode. The control portion 21 may also perform processing to increase the absolute value of the developing voltage applied to the developing roller 41 when the cleaning operation is executed in the second control mode above the absolute value of the developing voltage applied to the developing roller 41 when the image forming operation is performed in the first control mode. The control portion 21 may also perform processing to reduce the absolute value of the supply voltage applied to the toner supply roller 42 when the cleaning operation is executed in the second control mode below the absolute value of the supply voltage applied to the toner supply roller 42 when the image forming operation is performed in the first control mode. Furthermore, when the cleaning operation is executed in the second control mode, the control portion 21 may perform both the processing for increasing the developing voltage applied to the developing roller 41 and the processing for reducing the supply voltage applied to the toner supply roller 42. By performing these types of processing, the potential relationship between the developing roller 41 and the toner supply roller 42 can be set at a potential relationship at which toner is unlikely to be supplied from the toner supply roller 42 to the developing roller 41. By forming this potential relationship, the amount of toner supplied to the surface of the developing roller 41 when the cleaning operation is executed in the second control mode is reduced below the amount of toner supplied to the surface of the developing roller 41 when the image forming operation is performed in the first control mode. As a result, the amount of toner coverage on the developing roller 41 at the time of the cleaning operation can be reduced.

When the cleaning operation is executed in the second control mode, the control portion 21 may perform processing to increase the developing voltage applied to the developing roller 41 above the developing voltage applied during the image forming operation in the first control mode. When the cleaning operation is executed in the second control mode, the control portion 21 may perform processing to reduce the regulating voltage applied to the developing blade 43 below the regulating voltage applied during the image forming operation in the first control mode. The control portion 21 may also perform processing to increase the absolute value of the developing voltage applied to the developing roller 41 when the cleaning operation is executed in the second control mode above the absolute value of the developing voltage applied to the developing roller 41 when the image forming operation is performed in the first control mode. The control portion 21 may also perform processing to reduce the absolute value of the regulating voltage applied to the developing blade 43 when the cleaning operation is executed in the second control mode below the absolute value of the regulating voltage applied to the developing blade 43 when the image forming operation is performed in the first control mode. Furthermore, when the cleaning operation is executed in the second control mode, the control portion 21 may perform both the processing for increasing the developing voltage applied to the developing roller 41 and the processing for reducing the regulating voltage applied to the developing blade 43 relative to the developing voltage and the regulating voltage applied during the image forming operation in the first control mode. By performing these types of processing, the potential relationship between the developing roller 41 and the developing blade 43 can be set at a potential relationship at which toner is unlikely to be carried on the developing roller 41. In other words, the toner is more likely to be electrically scraped away by the developing blade 43. By forming this potential relationship, the amount of toner carried on the surface of the developing roller 41 when the cleaning operation is executed in the second control mode is reduced below the amount of toner carried on the surface of the developing roller 41 when the image forming operation is performed in the first control mode. As a result, the amount of toner coverage on the developing roller 41 at the time of the cleaning operation can be reduced.

Second Embodiment

In an image forming apparatus according to this embodiment, the control portion 21 records a number of printed images (the number of the image forming operations) following implementation of the preceding cleaning operation for removing substances adhered to the photosensitive drum 1 in the storage portion 22. Further, in the image forming apparatus according to this embodiment, the image forming operation is temporarily halted at the point where the recorded number of printed images reaches a predetermined threshold, whereupon the cleaning operation is implemented to remove substances adhered to the photosensitive drum 1. The control portion 21 controls driving of the photosensitive drum 1 and the developing roller 41 so that every time the number of printed images following implementation of the preceding cleaning operation reaches the predetermined threshold, the next cleaning operation is implemented. The threshold for the number of printed images from implementation of the preceding cleaning operation to implementation of the next cleaning operation is set at 50, but the threshold may be set at a value other than 50.

Figure 4:
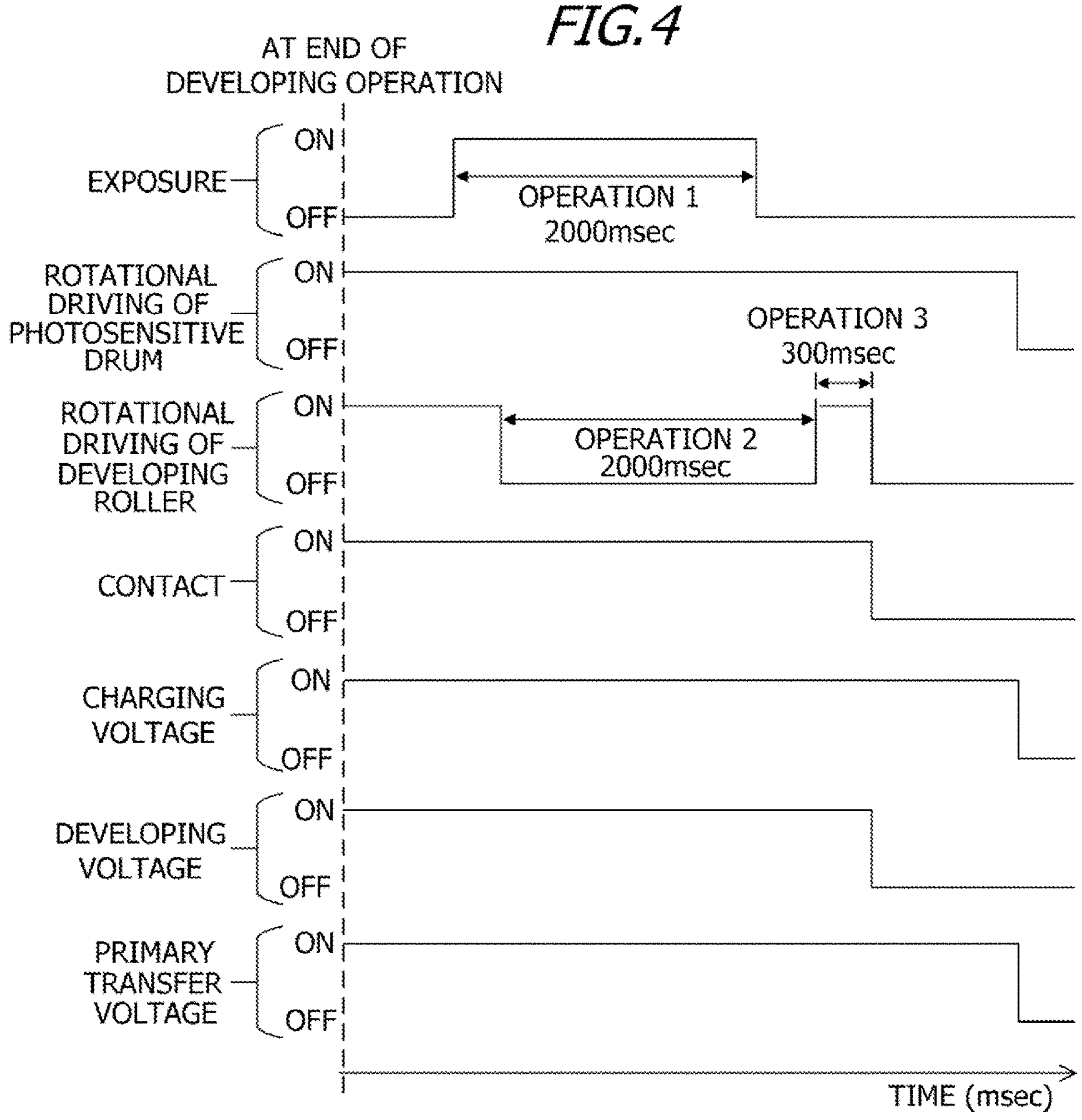
FIG. 4 is a timing chart of a cleaning operation according to a second embodiment.

FIG. 4 is a timing chart of the cleaning operation performed by the image forming apparatus of this embodiment. The parameters of FIG. 4 are similar to those of FIG. 2. As shown in FIG. 4, in the image forming apparatus of this embodiment, the implementation time of operation 2 is set at 2000 msec, which is longer than the 700 msec of the first embodiment, and as a result, the efficiency with which substances adhered to the photosensitive drum 1 are scraped away during each cleaning operation is improved in comparison with the first embodiment. All other configurations of this embodiment are similar to the configurations of the first embodiment, and therefore description of the other configurations has been omitted.

Effect Confirmation

To confirm the effects of the cleaning operation of this embodiment, the following effect confirmation tests were implemented. As condition 1, using the image forming apparatus of this embodiment in a new state, a print job in which the image forming operation is completed by consecutively printing two images with a print percentage of 5% was implemented 2000 times such that a total of 4000 sheets were printed. After printing the 4000 sheets, the presence or absence of residual transfer ghosting was confirmed using a similar test image to the first embodiment, and the presence or absence of substances adhered to the surface of the photosensitive drum 1 was confirmed using an electron microscope.

As condition 2, using the image forming apparatus of this embodiment in a new state, a print job in which 20 images with a print percentage of 5% were printed consecutively was implemented 200 times such that a total of 4000 sheets were printed. After printing the 4000 sheets, the presence or absence of residual transfer ghosting was confirmed using a similar test image to the first embodiment, and the presence or absence of substances adhered to the surface of the photosensitive drum 1 was confirmed using an electron microscope.

As condition 3, using the image forming apparatus of this embodiment in a new state, a print job in which 100 images with a print percentage of 5% were printed consecutively was implemented 40 times such that a total of 4000 sheets were printed. After printing the 4000 sheets, the presence or absence of residual transfer ghosting was confirmed using a similar test image to the first embodiment, and the presence or absence of substances adhered to the surface of the photosensitive drum 1 was confirmed using an electron microscope.

As condition 4, using the image forming apparatus of this embodiment in a new state, a print job in which 250 images with a print percentage of 5% were printed consecutively was implemented 16 times such that a total of 4000 sheets were printed. After printing the 4000 sheets, the presence or absence of residual transfer ghosting was confirmed using a similar test image to the first embodiment, and the presence or absence of substances adhered to the surface of the photosensitive drum 1 was confirmed using an electron microscope. The effect confirmation tests described above were all implemented in an environment with a temperature of 23° C. and a relative humidity of 50%.

FIG. 5 is a table showing results of the effect confirmation tests applied to the cleaning operation of this embodiment. As shown in FIG. 5, with the image forming apparatus of this embodiment, even after printing 4000 sheets and regardless of the printing conditions, residual transfer ghosting did not occur, and the presence of substances adhered to the photosensitive drum 1 was not confirmed under an electron microscope.

By implementing the next cleaning operation every time the number of printed images following implementation of the preceding cleaning operation reaches a predetermined threshold, as described above, the cleaning operation can be implemented at an appropriate timing, regardless of the number of images printed in a series of print jobs. Thus, by means of a simple configuration, it is possible to provide an image forming apparatus with which an adhered substance such as toner or an external additive adhered to the surface of the photosensitive drum 1 can be sufficiently removed from the surface of the photosensitive drum 1 regardless of the amount or strength of the adhered substance.

The threshold for the number of printed images from implementation of the preceding cleaning operation to implementation of the next cleaning operation and the implementation time of each cleaning operation are preferably set in accordance with the configuration and use conditions of the image forming apparatus, and are not limited to the settings of this embodiment. Further, the determination reference from implementation of the preceding cleaning operation to implementation of the next cleaning operation is not limited to the number of printed images, as used in this embodiment, and may be a rotation distance (a travel distance) of the photosensitive drum 1, a rotation distance of the developing roller 41, and so on. Needless to mention, similar effects to those of this embodiment are acquired likewise when rotation distances of the photosensitive drum 1 and the developing roller 41 are used as the determination reference.

Third Embodiment

An image forming apparatus of this embodiment is installed with the environment detection sensor 23 for detecting the temperature and the humidity on the periphery of the image forming apparatus, and the implementation time of the cleaning operation is modified in accordance with detection results acquired by the environment detection sensor 23. The environment detection sensor 23, serving as an acquisition portion, acquires environment information (environment information of the image forming apparatus) including the temperature and/or the humidity on the periphery of the image forming apparatus. The control portion 21 determines the implementation time (execution time) of the cleaning operation in accordance with the environment information of the image forming apparatus.

Figure 6:
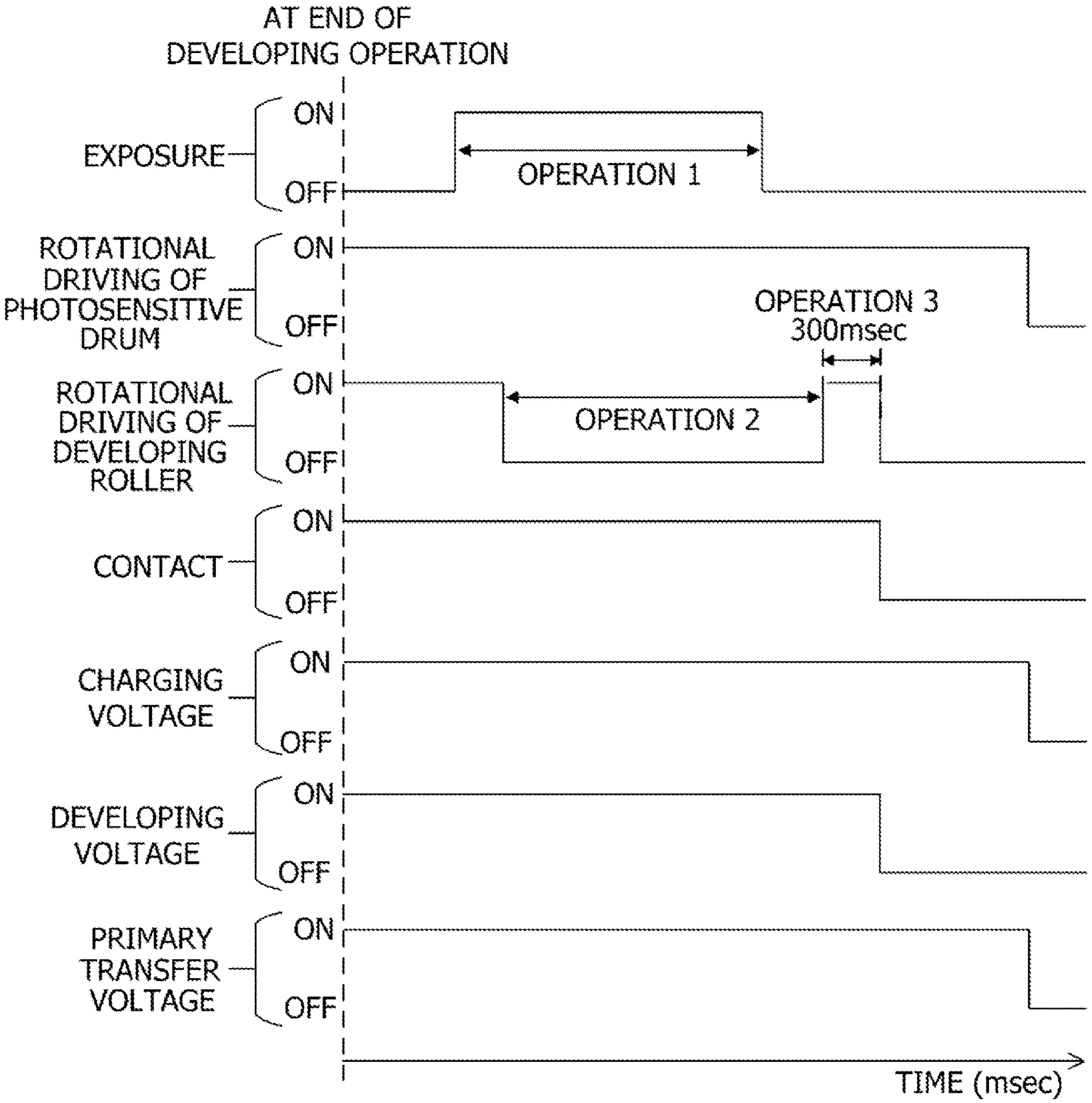
FIG. 6 is a timing chart of a cleaning operation according to a third embodiment.

FIG. 6 is a timing chart of the cleaning operation performed by the image forming apparatus of this embodiment. The parameters of FIG. 6 are similar to those of FIG. 2. In this embodiment, the implementation times of operation 1 and operation 2 shown in FIG. 6 are modified in accordance with the temperature and the humidity detected by the environment detection sensor 23. In this embodiment, the respective implementation times of operation 1 and operation 2 are set at the same length.

FIG. 7 is a table showing relationships between the temperature (° C.) and the humidity (%) detected by the environment detection sensor 23 of the image forming apparatus according to this embodiment, and the implementation time (msec) of operation 2. As shown in FIG. 7, the implementation time of operation 2 is set to lengthen as the temperature detected by the environment detection sensor 23 decreases. For example, when the temperature detected by the environment detection sensor 23 is lower than 0° C., the implementation time of operation 2 is set within a range of at least 3500 msec and not more than 5600 msec. The reason for this is that as the temperature of the use environment of the image forming apparatus decreases, the temperature of a substance adhered to the surface of the photosensitive drum 1 also decreases, leading to an increase in the hardness of the adhered substance, and as a result, it becomes more difficult to scrape away the substance adhered to the photosensitive drum 1.

Furthermore, as shown in FIG. 7, the implementation time of operation 2 is set to lengthen as the humidity detected by the environment detection sensor 23 decreases. The reason for this is that as the humidity of the use environment of the image forming apparatus decreases, the moisture content of the substance adhered to the photosensitive drum 1 also decreases, leading to an increase in the hardness of the adhered substance, and as a result, it becomes more difficult to scrape away the substance adhered to the surface of the photosensitive drum 1. All other configurations of this embodiment are similar to the configurations of the second embodiment, and therefore description of the other configurations has been omitted.

Effect Confirmation

To confirm the effects of the cleaning operation of this embodiment, the following effect confirmation tests were implemented under respective environmental conditions shown in FIG. 8. FIG. 8 is a table showing results of the effect confirmation tests applied to the cleaning operation of this embodiment. Using the image forming apparatus of this embodiment in a new state, a print job in which the image forming operation is completed by consecutively printing two images with a print percentage of 5% was implemented 2000 times such that a total of 4000 sheets were printed. After printing the 4000 sheets, the presence or absence of residual transfer ghosting was confirmed using a similar test image to the first embodiment, and the presence or absence of substances adhered to the surface of the photosensitive drum 1 was confirmed using an electron microscope. As shown in FIG. 8, with the image forming apparatus of this embodiment, even after printing 4000 sheets and regardless of the environmental conditions, residual transfer ghosting did not occur, and the presence of substances adhered to the photosensitive drum 1 was not confirmed under an electron microscope.

In this embodiment, as described above, the control portion 21 modifies the implementation time of the cleaning operation in accordance with the use environment of the image forming apparatus by determining the implementation time of the cleaning operation in accordance with the environment information of the image forming apparatus. As a result, it is possible to provide an image forming apparatus with which an adhered substance such as toner or an external additive adhered to the surface of the photosensitive drum 1 can be sufficiently removed therefrom regardless of the use environment of the image forming apparatus.

According to the present invention, it is possible to provide an image forming apparatus with which a substance adhered to the surface of an image bearing member can be sufficiently removed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-096238, filed on Jun. 2, 2020, which is hereby incorporated by reference herein in its entirety.

What is claimed is:

1. An image forming apparatus for forming an image on a recording medium, the image forming apparatus comprising:

a rotatable image bearing member;

a rotatable developer carrying member that forms a developing portion in contact with the surface of the image bearing member in a contacting state, and forms a developer image on the surface of the image bearing member by supplying the developer to an electrostatic latent image formed on the surface of the image bearing member in the developing portion;

a supply member that comes into contact with the developer carrying member so as to supply the developer to a surface of the developer carrying member;

a supply voltage application portion that applies a supply voltage to the supply member; and a controller that controls driving of the image bearing member and the developer carrying member, wherein, after performing an image forming operation, in a state in which the image bearing member is rotating, the controller controls to perform a stop operation to stop rotation of the developer carrying member, and, after performing the stop operation, the controller controls to perform a rotation operation to rotate the developer carrying member, wherein the controller controls driving of the developer carrying member so that a part of the surface of the developer carrying member that is positioned in the developing portion at a time of the rotation operation comes into contact with the supply member when the developer carrying member rotates following the stop operation, and wherein the controller performs the rotation operation in a state in which processing for reducing an absolute value of the supply voltage applied to the supply member below the absolute value of the supply voltage applied to the supply member during the image forming operation has been performed.

2. The image forming apparatus according to claim 1, further comprising:

a charging member that charges a surface of the image bearing member;

a charging voltage application portion that applies a charging voltage to the charging member; and a developing voltage application portion that applies a developing voltage to the developer carrying member, wherein the surface of the image bearing member is charged by the charging member to which the charging voltage is applied, and the developing voltage is applied to the developer carrying member, and the controller performs the stop operation in a state in which at least one of the following has been performed:

(1) processing for reducing an absolute value of the charging voltage applied to the charging member below the absolute value of the charging voltage applied to the charging member during the image forming operation, and (2) processing for increasing an absolute value of the developing voltage applied to the developer carrying member above the absolute value of the developing voltage applied to the developer carrying member during the image forming operation.

3. The image forming apparatus according to claim 2, wherein, during the stop operation, a width of a part of the image bearing member on which a predetermined surface potential is formed in the rotation direction of the image bearing member is longer than a width of the developing portion in the rotation direction of the image bearing member.

4. The image forming apparatus according to claim 1, further comprising:

a regulating member that comes into contact with the developer carrying member so as to regulate a thickness of the developer carried on a surface of the developer carrying member; and a regulating voltage application portion that applies a regulating voltage to the regulating member, wherein the controller performs the rotation operation in a state in which processing for reducing an absolute value of the regulating voltage applied to the regulating member below the absolute value of the regulating voltage applied to the regulating member during the image forming operation has been performed.

5. The image forming apparatus according to claim 1, wherein, during the stop operation, the image bearing member rotates by at least one turn.

6. The image forming apparatus according to claim 1, further comprising:

a transfer member that transfers the developer image formed on the image bearing member onto an intermediate transfer member; and a transfer voltage application portion that applies a transfer voltage to the transfer member, wherein, during the stop operation, the controller controls the transfer voltage application portion so that the transfer voltage is applied to the transfer member at an opposite polarity to a normal polarity of the developer, whereby the developer, having moved from the developer carrying member onto the image bearing member, is transferred onto the intermediate transfer member.

7. The image forming apparatus according to claim 6, further comprising:

a collecting member that collects the developer transferred onto the intermediate transfer member, wherein, during the stop operation, the collecting member collects the developer transferred onto the intermediate transfer member.

8. The image forming apparatus according to claim 1, further comprising:

a regulating member that comes into contact with the developer carrying member so as to regulate a thickness of the developer carried on a surface of the developer carrying member, wherein the controller controls driving of the developer carrying member so that a part of the surface of the developer carrying member that is positioned in the developing portion at a time of the rotation operation comes into contact with the regulating member when the developer carrying member rotates following the stop operation.

9. The image forming apparatus according to claim 1, wherein the controller controls driving of the image bearing member and the developer carrying member so that every time the number of the image forming operations following implementation of the preceding stop operation and the preceding rotation operation reaches a predetermined threshold, the next stop operation and the next rotation operation are implemented.

10. The image forming apparatus according to claim 1, further comprising:

an acquisition portion that acquires environment information relating to the image forming apparatus, wherein the controller determines an implementation time of the stop operation in accordance with the environment information.

11. The image forming apparatus according to claim 1, wherein the developer carrying member is an elastic roller in which an elastic layer and a surface layer are formed on a core metal.

12. The image forming apparatus according to claim 11, wherein the surface layer is polyurethane resin.

13. The image forming apparatus according to claim 11, wherein a thickness of the surface layer is at least 5 μm and not more than 15 μm.

14. The image forming apparatus according to claim 11, wherein urethane resin particles with an average particle diameter of at least 5 μm and not more than 15 μm are added to the surface layer.

15. The image forming apparatus according to claim 11, wherein the elastic layer is at least one rubber selected from a group consisting of a natural rubber, an isoprene rubber, a styrene rubber, a butyl rubber, a butadiene rubber, a fluorine rubber, a urethane rubber, and a silicone rubber.

16. The image forming apparatus according to claim 11, wherein a thickness of the elastic layer is at least 0.5 mm and not more than 10.0 mm.

17. The image forming apparatus according to claim 1, wherein the developer carrying member has an Asker C hardness of at least 10 and not more than 80.

18. The image forming apparatus according to claim 1, wherein the developer carrying member carries a one-component developer.

19. The image forming apparatus according to claim 1, wherein the developer carrying member moves from the contacting state to a separating state in which the developer carrying member and the image bearing member are separated from each other.

20. The image forming apparatus according to claim 19, wherein in switching between the contacting state, in which the developer carrying member is in contact with the surface of the image bearing member, and the separating state, in which the developer carrying member and the image bearing member are separated from each other, the controller controls to move the developer carrying member.

21. The image forming apparatus according to claim 1, further comprising:

an exposure portion that forms the electrostatic latent image on a surface of the image bearing member by exposing the image bearing member, wherein, the controller controls to perform the stop operation to stop rotation of the developer carrying member in a state in which a region of the image bearing member exposed by the exposure portion and the developer carrying member are in contact with each other in the developing portion in the contacting state.

* * * * *